(12) United States Patent
Li

(10) Patent No.: US 9,483,705 B2
(45) Date of Patent: Nov. 1, 2016

(54) IMAGE PROCESSING DEVICE, IMAGE PROCESSING METHOD, AND IMAGE PROCESSING PROGRAM

(71) Applicant: FUJIFILM Corporation, Tokyo (JP)

(72) Inventor: Yuanzhong Li, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/669,382

(22) Filed: Mar. 26, 2015

(65) Prior Publication Data

US 2015/0199587 A1 Jul. 16, 2015

Related U.S. Application Data

(63) Continuation of application No. PCT/JP2013/005555, filed on Sep. 20, 2013.

(30) Foreign Application Priority Data

Sep. 27, 2012 (JP) .................................. 2012-213636

(51) Int. Cl.
*G06T 7/00* (2006.01)
*G06K 9/46* (2006.01)
*G06K 9/34* (2006.01)

(52) U.S. Cl.
CPC ............... *G06K 9/4604* (2013.01); *G06K 9/34* (2013.01); *G06K 9/4638* (2013.01);
(Continued)

(58) Field of Classification Search
CPC .... G06K 9/4604; G06K 9/34; G06K 9/4638; G06K 9/4642; G06K 9/4647; G06K 7/0012; G06K 7/0081; G06K 7/0093
See application file for complete search history.

(56) References Cited

U.S. PATENT DOCUMENTS

2002/0048401 A1  4/2002 Boykov et al.
2008/0044080 A1  2/2008 Li
(Continued)

FOREIGN PATENT DOCUMENTS

JP  2007-307358 A  11/2007
WO  2011/055930 A1  5/2011

OTHER PUBLICATIONS

Li, Yuanzhong, Ito Wataru, Iwano, Shingo, "Interactive Segmentation of Lung Nodules using Adaboost and Graph Cuts" Fourth International Workshop on Pulmonary Image Analysis. Sep. 18, 2011.*

(Continued)

*Primary Examiner* — Kim Vu
*Assistant Examiner* — Molly Delaney
(74) *Attorney, Agent, or Firm* — Sughrue Mion, PLLC

(57) ABSTRACT

Based on a long diameter of a set specific region, a first region estimated as the specific region and a second region estimated as a background region are set within an input image. Based on a density histogram of each pixel in the first region and a density histogram of each pixel in the second region, a first evaluation value which indicates a likelihood that a density value represents the specific region is calculated for each density value. For each pair of two adjacent pixels within the input image, based on the first evaluation values, a second evaluation value which indicates a likelihood that the two adjacent pixels represent a contour is calculated. Based on the second evaluation value, connection costs between a plurality of nodes respectively representing each pair of the two adjacent pixels are set. The plurality of nodes are connected based on the connection costs.

12 Claims, 5 Drawing Sheets

(52) U.S. Cl.
CPC ......... *G06K 9/4642* (2013.01); *G06K 9/4647* (2013.01); *G06T 7/0012* (2013.01); *G06T 7/0081* (2013.01); *G06T 7/0093* (2013.01); *G06T 2207/10004* (2013.01); *G06T 2207/10072* (2013.01); *G06T 2207/20072* (2013.01); *G06T 2207/20141* (2013.01); *G06T 2207/30096* (2013.01)

(56) References Cited

U.S. PATENT DOCUMENTS

2008/0247619 A1 10/2008 Li
2012/0093414 A1 4/2012 Choi et al.

OTHER PUBLICATIONS

Program of the Fourth International Workshop on Pulmonary Image Analysis, Sep. 18, 2011.*

Junichi Kamiyama et al., "Simultaneous extraction of multiple organs using a combination of conditional statistical shape model and graph cuts", IEICE Technical Report, 2012, pp. 299-304, vol. 111, No. 389.

Patrick Therasse et al., "New Guidelines to Evaluate the Response to Treatment in Solid Tumors", Journal of the National Cancer Institute, Feb. 2, 2000, pp. 205-216, vol. 92, No. 3.

Shingo Iwano, M.D. et al., "Semi-automatic Volumetric Measurement of Lung Cancer Using Multi-detector CT Effects of Nobule Characteristics", Academic Radiology 2009, pp. 1179-1186, vol. 16, No. 10.

International Search Report for PCT/JP2013/005555 dated Jan. 28, 2014.

Communication dated Jun. 23, 2016 from the European Patent Office in counterpart application No. 13841846.2.

M. Kulkarni et al., "Interactive Image Segmentation using Graph Cuts," Department of Electrical Engineering, University of Cape Town (2009) 6 pages total.

Y.Y. Boykov et al., "Interactive Graph Cuts for Optimal Boundary & Region Segmentation of Objects in N-D Images," Imaging and Visualization Department, Siemens Corporate Research (2001) pp. 105-112.

L. Grady et al., "Weights and Topology: A Study of the Effects of Graph Construction on 3D Image Segmentation," Siemens Corporate Research—Dept. of Imaging and Visualization (2008) 9 pages total.

W. Yang et al., "User-Friendly Interactive Image Segmentation Through Unified Combinatorial User Inputs," Transactions on Image Processing, vol. 19, No. 9, Sep. 2010 pp. 2470-2479.

* cited by examiner

IMAGE PROCESSING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2013/005555 filed on Sep. 20, 2013, which claims priority under 35 U.S.C. §119(a) to Japanese Patent Application No. 2012-213636 filed on Sep. 27, 2012. Each of the above applications is hereby expressly incorporated by reference, in its entirety, into the present application.

BACKGROUND OF THE INVENTION

1. Field of the Invention

The present invention relates to an image processing device, an image processing method, and an image processing program for extracting a specific region based on the density values of pixels in an input image.

2. Description of the Related Art

Hitherto, in the medical field, processing for extracting and displaying a specific region such as a lesion region or an internal organ region within a medical image is executed in order to provide an image exhibiting high diagnostic performance.

In P. Therasse et al., "New Guidelines to Evaluate the Response to Treatment in Solid Tumors", Journal of the National Cancer Institute, Vol. 92, No. 3, pp. 205-216, 2000 (Non Patent Literature 1), it is recommended that the long diameter of a lesion region and the longest distance in a direction orthogonal to the long diameter be used as an index for determining a deteriorating situation of a disease and treatment effect in treatment of a tumor. In recent years, in order to accurately determine the treatment effect of a disease, there is also a demand to evaluate the size of a specific region such as a tumor region with more accuracy, and as disclosed in S. Iwano et al., "Semi-automatic Volumetric Measurement of Lung Cancer Using Multi-detector CT: Effects of Nodule Characteristics", Academic Radiology, Vol. 16, No. 10, pp. 1179-1186, 2009 (Non Patent Literature 2), there is also proposed a method using an area or a volume of a lesion region as an index for determining the treatment effect of a disease.

As a method of extracting the specific region within the image, as disclosed in Japanese Unexamined Patent Publication No. 2007-307358 (Patent Literature 1) or the like, there is a method involving causing a user to designate an arbitrary point in the lesion region within the medical image, setting a discrimination region with reference to the designated point, and evaluating whether each pixel in the region is a pixel indicating a contour of the lesion region, to determine the contour of the lesion region based on evaluation results. Here, it is evaluated whether each pixel is a pixel indicating the contour based on an evaluation function found in advance by conducting machine learning using a large number of sample images including lesion regions whose contours are known.

SUMMARY OF THE INVENTION

However, with the method disclosed in Patent Literature 1, a specific region is extracted by using a machine learning result of a sample image based on an arbitrary point designated in a specific region within a medical image, and hence it is necessary to use the machine learning result of a suitable sample image corresponding to the kind of the specific region in order to extract the specific region with high precision. Therefore, there is demanded a technology for precisely extracting various kinds of specific regions having mutually different density values, shapes, sizes, or the like without depending on the kind of the machine learning result of such a sample image.

In view of the above-mentioned problem, it is an object of the present invention to provide an image processing device, an image processing method, and an image processing program, which are capable of extracting a specific region from an input image with high precision.

In order to achieve the above-mentioned object, an image processing device according to one embodiment of the present invention includes: a long diameter setting unit for setting a long diameter of a specific region within an input image containing the specific region; a region setting unit for setting, based on the set long diameter, a first region estimated as highly probable to be the specific region within the input image and a second region estimated as highly probable to be a background region, which is a region other than the specific region within the input image; an evaluation unit for calculating a first histogram, which is a density histogram of a density value of each pixel in the first region, and a second histogram, which is a density histogram of a density value of each pixel in the second region, calculating, for each density value, a first evaluation value which indicates a likelihood that the each density value represents the specific region based on the first histogram and the second histogram, and calculating, for each pair of two adjacent pixels within the input image, a second evaluation value which indicates a likelihood of being a contour, which is a likelihood that the two adjacent pixels represent the contour, based on the first evaluation values respectively corresponding to the density values of the two adjacent pixels; and a specific region extracting unit for extracting the specific region by defining a first reference node belonging to the specific region, a second reference node belonging to the background region, and a plurality of nodes representing respective pixels within the input image, setting a connection cost indicating how likely the respective nodes are to be connected to each other based on the second evaluation value, and connecting the plurality of nodes to each other based on the set connection cost.

An image processing method to be executed by the image processing device according to one embodiment of the present invention includes: a long diameter setting step of setting a long diameter of a specific region within an input image containing the specific region; a region setting step of setting, based on the set long diameter, a first region estimated as highly probable to be the specific region within the input image and a second region estimated as highly probable to be a region other than the specific region within the input image; an evaluation step of calculating a first histogram, which is a density histogram of a density value of each pixel in the first region, and a second histogram, which is a density histogram of a density value of each pixel in the second region, calculating, for each density value, a first evaluation value which indicates a likelihood that the each density value represents the specific region based on the first histogram and the second histogram, and calculating, for each pair of two adjacent pixels within the input image, a second evaluation value which indicates a likelihood of being a contour, which is a likelihood that the two adjacent pixels represent the contour, based on the first evaluation values respectively corresponding to the density values of the two adjacent pixels; and a specific region extracting step of extracting the specific region by defining a first reference node belonging to the specific region, a second reference node belonging to a background region, and a plurality of nodes representing respective pixels within the input image, setting a connection cost indicating how likely the respective nodes are to be connected to each other based on the second evaluation value, and connecting the plurality of nodes to each other based on the set connection cost.

The image processing program according to one embodiment of the present invention causes a computer to execute the above-mentioned method.

In the image processing device according to one embodiment of the present invention, any input image that includes one or more specific regions may be used. For example, the input image may be a medical image acquired by imaging a subject by an arbitrary modality such as PET, CT, MRI, SPECT, or ultrasound imaging, and the specific region may be a region indicating an abnormal shadow region such as a lesion or a tumor.

Further, in the image processing device according to one embodiment of the present invention, the above-mentioned "long diameter of a specific region" may be any diameter that is recognized as roughly representing the long diameter of the specific region. For example, the "long diameter of the specific region" includes a diameter that is not strictly the same as the longest diameter of the specific region as long as the diameter is set based on information for identifying the long diameter, which is input on the input image by a user who has judged the diameter as the long diameter of the specific region.

Further, in the image processing device according to one embodiment of the present invention, the meaning of "two adjacent pixels" in the above encompasses not only two pixels that are directly next to each other but also two pixels the distance between which is so short relative to the size of the input image that the pixels can be deemed as being adjacent to each other.

Further, the above-mentioned "first region" may be a region having any size and shape as long as the region is estimated as highly probable to be the specific region based on the above-mentioned "long diameter of the specific region". Further, any estimation method capable of determining the probability of being the specific region may be employed. Note that, the position of the "first region" may be set to an arbitrary position within the input image as long as the position is estimated as highly probable to be the specific region. Further, the "first region" may be formed of one region or may be formed of a plurality of regions.

For example, it is preferred that the first region be set as a region contained in an elliptical region whose long diameter is the set long diameter. Further, in this case, the "region contained in an elliptical region whose long diameter is the set long diameter" may be such an entire elliptical region that the entirety of the set long diameter is set as the long diameter of the elliptical region or may be a partial region of the elliptical region.

The above-mentioned "second region" may be a region having any size and shape as long as the region is estimated as highly probable to be the background region other than the specific region based on the above-mentioned "long diameter of the specific region". Further, any estimation method capable of determining the probability of being the region other than the specific region may be employed. Note that, the position of the "second region" may be set to an arbitrary position within the input image as long as the position is estimated as highly probable to be the region other than the specific region. Further, the "second region" may be formed of one region or may be formed of a plurality of regions.

For example, it is preferred that the second region be set as a region of a given shape located outside a circle whose diameter is the set long diameter. Note that, the "region of a given shape" referred to here can be set as the region having the arbitrary shape as long as the region has a given area that allows the region to be located outside the circle whose diameter is the set long diameter. For example, the region may be a ring-shaped region extending with a given width outside the circle whose diameter is the set long diameter, or a polygonal region such as a rectangle located outside the circle whose diameter is the set long diameter.

The above-mentioned "first evaluation value" may be a value defined by an arbitrary method based on the first histogram and the second histogram as long as the value indicates the likelihood that each density value represents the specific region for each density value. For example, the first evaluation value may represent a logarithmic value of a ratio of the frequency value in the second histogram to the frequency value in the first histogram for each density value, and the first evaluation value may also represent a difference between the frequency value in the first histogram and the frequency value in the second histogram for each density value.

The above-mentioned "second evaluation value" may be a value defined by an arbitrary method based on the first evaluation values respectively corresponding to the density values of the two adjacent pixels as long as the value represents the likelihood of being the contour, which is the likelihood that the two adjacent pixels represent the contour for each pixel within the input image. For example, it is preferred that the second evaluation value be calculated such that the likelihood of being the contour becomes higher as the difference between the first evaluation values respectively corresponding to the two adjacent pixels becomes larger.

Further, in the image processing device according to one embodiment of the present invention, it is possible to employ an arbitrary method in which the specific region extracting unit extracts the specific region by defining the first reference node belonging to the specific region, the second reference node belonging to the background region, and the plurality of nodes representing the respective pixels within the input image, setting the connection cost indicating how likely the respective nodes are to be connected to each other based on the second evaluation value, and connecting the plurality of nodes to each other based on the connection cost. For example, it is possible to extract the specific region by defining the input image by the first reference node belonging to the specific region, the second reference node belonging to the background region, the plurality of nodes indicating the respective pixels, and an edge connecting the respective nodes, expressing the input image as a graph, minimizing the connection cost of the graph by minimizing a given evaluation function representing a total sum of the connection costs of the respective nodes within the graph by use of graph cut, and dividing the graph into the specific region and the background region. Note that, an arbitrary evaluation function applicable to the graph cut can be used as the given evaluation function.

Further, the phrase "setting a connection cost indicating how likely the respective nodes are to be connected to each other based on the second evaluation value" in the above means that at least some connection costs selected from the group consisting of a connection cost that indicates how likely the first reference node is to be connected to the nodes that represent pixels, a connection cost that indicates how likely the second reference node is to be connected to the nodes that represent pixels, and a connection cost that indicates how likely the plurality of nodes that represent the plurality of pixels are to be connected to each other, are set based on the second evaluation value.

For example, in the image processing device according to one embodiment of the present invention, it is preferred that the connection cost be set such that it becomes more difficult for the nodes respectively corresponding to the two adjacent pixels to be connected to each other as the likelihood that the two adjacent pixels represent the contour becomes higher based on the second evaluation value.

Further, in the image processing device according to one embodiment of the present invention, it is preferred that the connection cost be set based on the set long diameter such that the node located within a given range from the set long diameter becomes more likely to be connected to the first reference node. Note that, the above-mentioned given range can be set to an arbitrary range exhibiting a high probability of belonging to the specific region, and it is preferred that the given range be a range within which the distance from the long diameter is small. For example, it is preferred that the connection cost of a first node, which is a node corresponding to the pixel located on the long diameter, be set such that the first node becomes more likely to be connected to the first reference node.

Further, in the image processing device according to one embodiment of the present invention, it is preferred that the connection cost be set based on the set long diameter such that the node corresponding to the pixel located outside both ends of the set long diameter in a direction in which the set long diameter extends becomes more likely to be connected to the second reference node. Note that, the direction in the phrase "in a direction in which the set long diameter extends" referred to here does not need to be strictly the same as the direction in which the long diameter extends, and can be set as a direction having an inclination of equal to or smaller than, for example, 30 degrees from the long diameter. For example, it is preferred that the connection cost be set such that a second node, which is a node corresponding to the pixel located outside both ends of the diameter on an extension of the long diameter becomes more likely to be connected to the second reference node.

Further, to "set" the connection cost of connecting the nodes to each other "such that the nodes are more likely to be connected" means that the connection cost is set to be relatively high in the case where an evaluation function used by the specific region extracting unit is a type that gives a higher evaluation for the likelihood of connection as the connection cost becomes higher, and means that the connection cost is set to be relatively low in the case where the evaluation function used by the specific region extracting unit is a type that gives a lower evaluation for the likelihood of connection as the connection cost becomes higher. Further, to "set" the connection cost "such that the nodes are less likely to be connected" means that the connection cost is set to be relatively low in the case where the evaluation function used by the specific region extracting unit is a type that gives a higher evaluation for the likelihood of connection as the connection cost becomes higher, and means that the connection cost is set to be relatively high in the case where the evaluation function used by the specific region extracting unit is a type that gives a lower evaluation for the likelihood of connection as the connection cost becomes higher.

According to the image processing device, method, and program of the present invention, the first region estimated as highly probable to be the specific region and the second region estimated as highly probable to be the region other than the specific region are set within the input image, based on the set long diameter of the specific region. The density histogram of each pixel in the set first region and the density histogram of each pixel in the second region are calculated. The first evaluation value which indicates the likelihood that the density value represents the specific region is calculated for each density value, based on these density histograms. For each pixel within the input image, the second evaluation value which indicates the likelihood of being the contour is calculated, which is the likelihood that the two adjacent pixels represent the contour, based on the first evaluation values respectively corresponding to the density values of the two adjacent pixels. The first reference node belonging to the specific region, the second reference node belonging to the background region, and the plurality of nodes representing the respective pixels within the input image are defined. The connection cost indicating how likely the respective nodes are to be connected to each other is set based on the second evaluation value, and the plurality of nodes are connected to each other based on the connection cost. The specific region is thus extracted. Accordingly, it is possible to extract the specific region with high precision by effectively using the information for identifying the long diameter of the specific region.

DESCRIPTION OF THE PREFERRED EMBODIMENTS

An image processing device, an image processing program, and an image processing method according to embodiments of the present invention will be described in detail below with reference to the drawings. The present invention can be applied to various fields in which processing for extracting a specific region within an input image is executed, but the description is made here by taking an example in which the present invention is applied to extraction of an abnormal shadow region during diagnostic imaging in the medical field.

Figure 1:
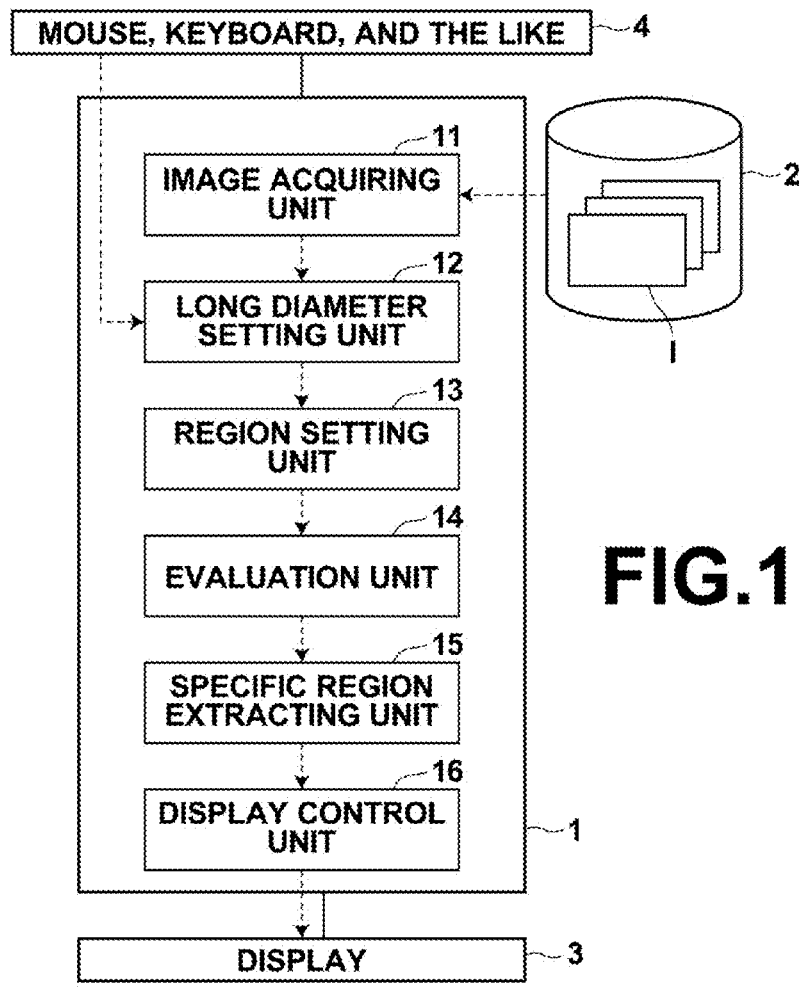
FIG. 1 is an electrical schematic block diagram of an image processing device according to an embodiment of the present invention.

FIG. 1 illustrates a schematic configuration of an image processing device realized by installing the image processing program on a workstation used by a doctor. An image processing device 1 includes a processor and a memory (both not shown) as the configuration of a standard workstation, and further includes a storage 2 such as a hard disk drive (HDD). Further, the image processing device 1 is connected to a display 3 and an input device 4 such as a mouse and a keyboard.

The image processing program and data to be referred to by the image processing program are stored in the storage 2 at a time of installation, and loaded into the memory at a time of booting. As processing to be executed by a CPU, the image processing program specifies image acquisition processing, long diameter setting processing, region setting processing, evaluation processing, specific region extracting processing, and display control processing.

Then, the CPU executes the respective pieces of processing described above in accordance with the specifications of the program, to thereby cause a general-purpose workstation to function as an image acquiring unit 11, a long diameter setting unit 12, a region setting unit 13, an evaluation unit 14, a specific region extracting unit 15, and a display control unit 16, which will be described later.

The image acquiring unit 11 acquires an input image I from the storage 2 into the memory. The storage 2 stores volume data transferred from an examination department in charge of imaging or acquired through a database search. In this embodiment, in an examination of a given patient, volume data V formed of a plurality of sliced images acquired by subjecting the patient's abdomen to a CT scan is transferred from the examination department, and stored in the storage 2. In this embodiment, the image acquiring unit 11 acquires each individual sliced image contained in the volume data V as an input image I. Then, each sliced image is individually subjected to image processing by the image processing device.

Figure 2:
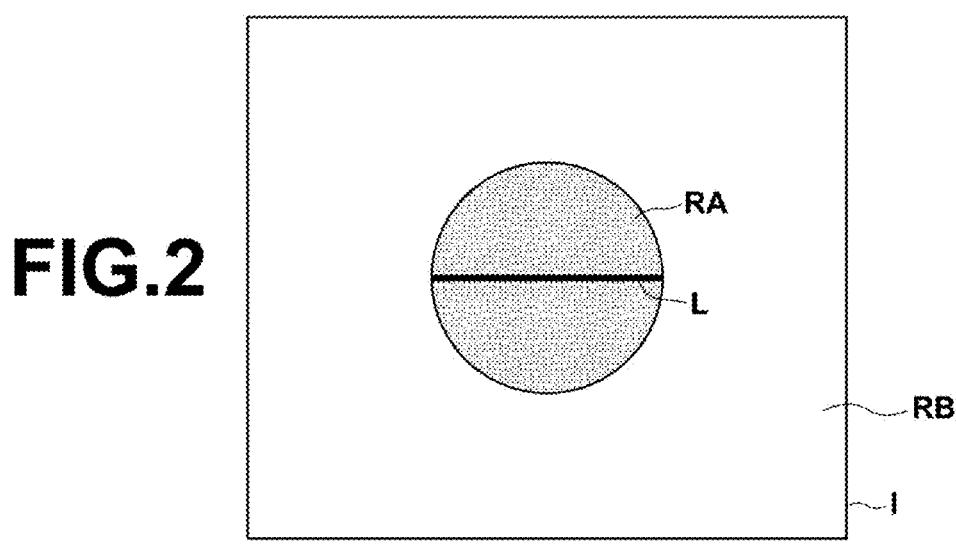
FIG. 2 is a diagram illustrating an example of a long diameter which is set in a specific region according to the embodiment of the present invention.

When it is detected that a long diameter input function has been selected in a given selection menu according to the above-mentioned image processing program, the long diameter setting unit 12 prompts a user to select or input information necessary to specify a long diameter. When the positions of both ends of a long diameter L are identified by the user's operation of the input device 4, the image acquiring unit 11 acquires the coordinates of the positions of both ends of the long diameter L into the memory as information for identifying the long diameter L of a specific region RA. FIG. 2 is a diagram illustrating an example in which the long diameter L is set in the specific region RA within the input image I.

Note that, without being limited to the above-mentioned method, the long diameter setting unit 12 may use information for identifying the long diameter L acquired by an arbitrary method that automatically measures the long diameter L.

Figure 3:
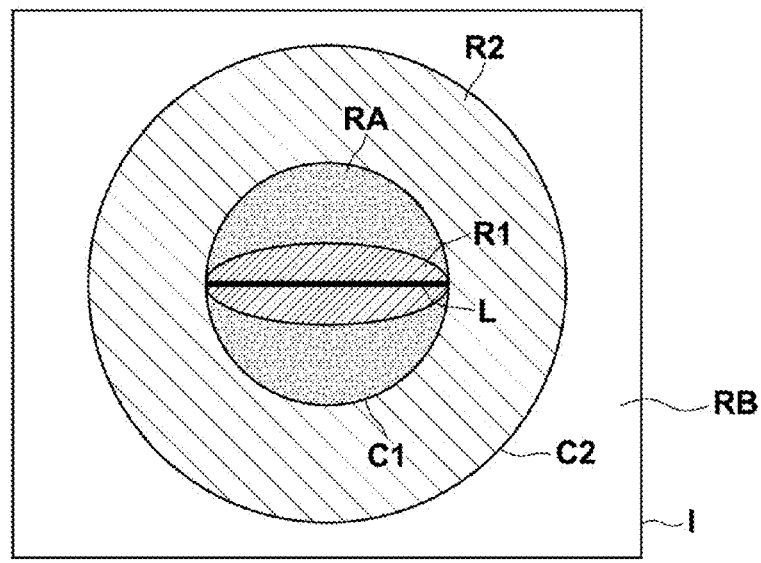
FIG. 3 is a diagram illustrating an example of a first region and a second region which are set based on the long diameter of FIG. 2.

The region setting unit 13 sets, in the input image I, based on the set long diameter L, a first region R1, which is estimated as highly probable to be the specific region RA, and a second region R2, which is estimated as highly probable to be a background region RB. The background region RB is a region in the input image I other than the specific region RA. FIG. 3 is a diagram illustrating an example in which the first region R1 and the second region R2 are set based on the long diameter L of FIG. 2.

The first region R1 is a region that is estimated as highly probable to be the specific region RA. The abnormal shadow region, which is a specific region RA in the input image I, is likely to be a region centered around the midpoint of the long diameter L, and a region in the vicinity of the long diameter L is therefore estimated as likely to be the specific region RA. Accordingly, a given size of elliptical region containing the vicinity of the long diameter L is set as the first region R1 in this embodiment as illustrated in FIG. 3. The minor axis of the elliptical region is set to a value that is obtained by multiplying the long diameter L by a given ratio. This is because a region that is highly probable to be the specific region RA can be set as the first region R1 easily and favorably by setting a region that is contained in the given size of elliptical region containing the vicinity of the long diameter L1 as the first region R1.

Note that, the first region R1 is set in this case as an elliptical region whose long diameter itself is the entirety of the set long diameter, but, for example, a partial region of the above-mentioned elliptical region may be set as the first region R1.

The first region R1 can be a region of any size and shape, and can be located at any position, as long as it is a region that is estimated as highly probable to be the specific region RA based on the long diameter L. It is preferred for the first region R1 to be shaped such that the vicinity of the long diameter L is contained therein and such that there is less chance of containing the background region RB therein. Any estimation method by which the probability of being the specific region RA can be determined is applicable. Further, the "first region" may be a single region or may include a plurality of regions.

The second region R2 is a region that is estimated as highly probable to be the background region RB. Because the abnormal shadow region, which is the specific region RA in the input image, is likely to be a region centered around the midpoint of the long diameter L as described above and the long diameter L can be regarded as representing the maximum diameter of the specific region RA in the direction in which the long diameter extends, it is estimated that the specific region RA is not found outside the long diameter L, or that, outside the long diameter L, the proportion of regions that are contained in the background region RB is relatively larger than the proportion of regions that are contained in the specific region RA.

Therefore, by setting the second region R2 as the region of a given shape which is located outside a circle C1 whose diameter is the set long diameter L, the information on the long diameter L can be used to set the second region R2 as the region that is highly probable to be the background region RB with ease in a preferred manner. Note that, the region of the given shape can be set as a region having an arbitrary shape as long as the region has a given area that allows the region to be located outside the circle C1. For example, the region may be set as a polygonal shape such as a rectangle located outside the circle C1.

In this embodiment, a ring-shaped region that stretches outside the circle C1 whose diameter is the set long diameter is set as the second region R2 as illustrated in FIG. 3. The ring-shaped region that is set as the second region R2 in this embodiment is between the circle C1 whose diameter is the set long diameter L and a circle C2 whose diameter is longer than the long diameter L. The center of the circle C2 is set so as to coincide with the center of the circle C1, and the length of the diameter of the circle C2 is set to a length that is obtained by multiplying the length of the set long diameter L by a given ratio, which is greater than 1.

The second region R2 can be a region of any size and shape, and can be located at any position, as long as it is a region that is estimated as highly probable to be a region other than the specific region based on the long diameter L. Any estimation method by which the probability of being the region other than the specific region RA can be determined is applicable. The second region R2 may be a single region or may include a plurality of regions.

In addition, the evaluation unit 14 calculates a first histogram, which is a density histogram of the density value of each pixel in the first region R1, and a second histogram, which is a density histogram of the density value of each pixel in the second region R2, and calculates a first evaluation value which indicates a likelihood that the density value represents the specific region RA for each density value based on the first histogram and the second histogram.

Figure 4A:
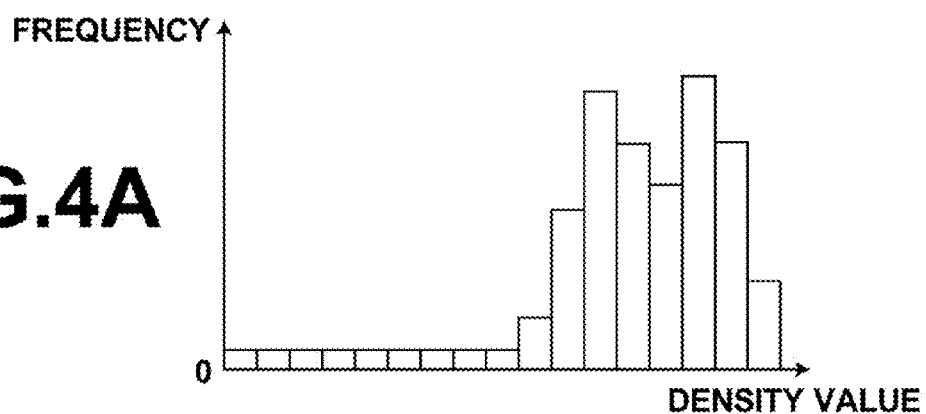
FIG. 4A is a graph showing an example of a first histogram according to the embodiment of the present invention.
Figure 4B:
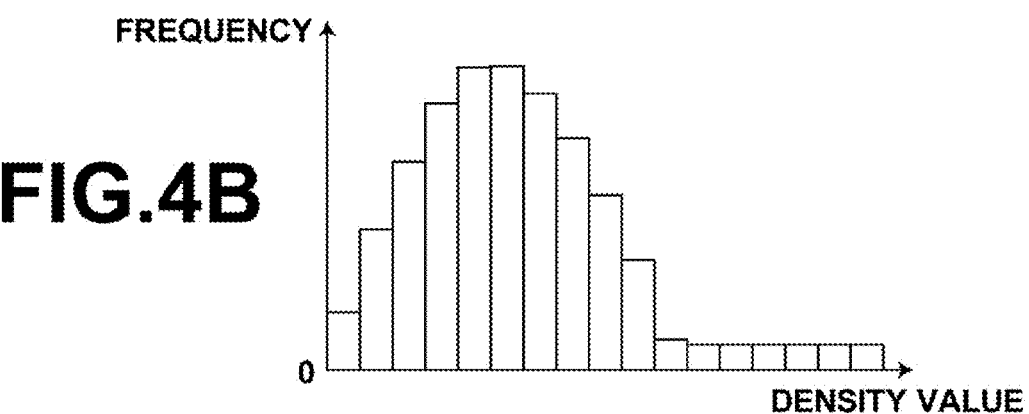
FIG. 4B is a graph showing an example of a second histogram according to the embodiment of the present invention.
Figure 4C:
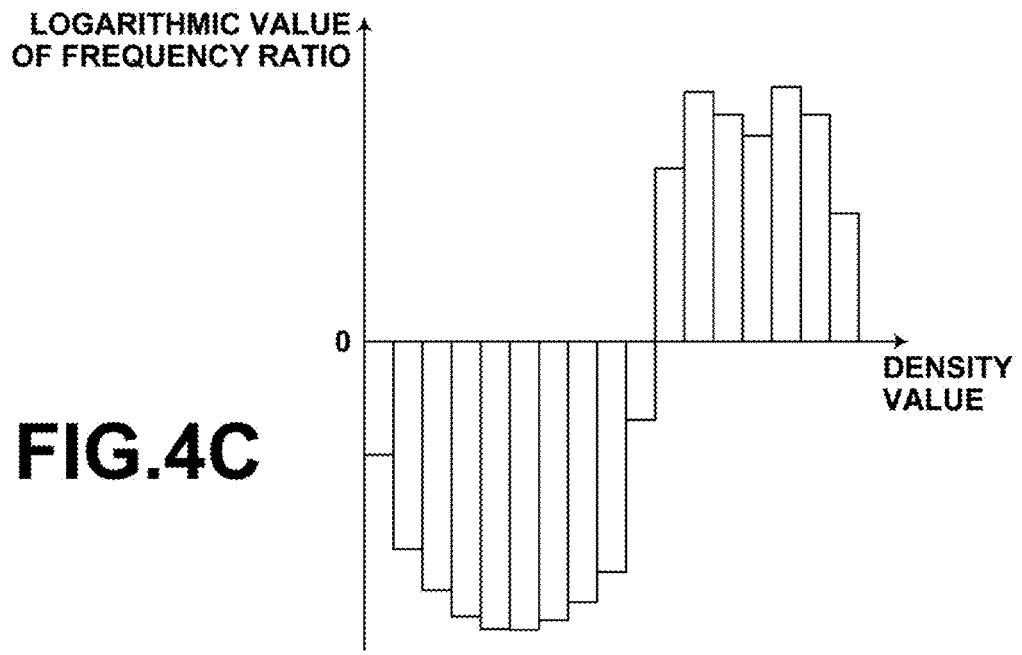
FIG. 4C is a graph showing logarithmic values (an example of a first evaluation value) of the ratio of frequencies in the first histogram of FIG. 4A to frequencies in the second histogram of FIG. 4B.

FIG. 4A is a graph showing an example of the first histogram in this embodiment. FIG. 4B is a graph showing an example of the second histogram in this embodiment. FIG. 4C is a graph showing an example of the first evaluation value in this embodiment.

The first histogram is a density histogram that is calculated by using only density values in a region highly probable to be the specific region (the first region R1). The frequency of a density value in the first histogram is therefore considered as indicative of the likelihood of that density value representing the specific region RA. In other words, it is considered that a higher frequency in the first histogram corresponds to a density value that has a higher likelihood of representing the specific region.

The frequency shown in the second histogram is a density histogram that is calculated by using only density values in a region highly probable to be the background region (the second region R2). The frequency of a density value in the second histogram is therefore considered as indicative of the likelihood of that density value representing the background region RB. In other words, it is considered that a higher frequency in the second histogram corresponds to a density value that has a higher likelihood of representing the background region RB. It is also considered that, when the likelihood of representing the background region RB increases in proportion to the frequency in the second histogram, the likelihood of representing the specific region decreases accordingly.

It is preferred for the first histogram and the second histogram to be normalized such that the scales of the histograms' vertical axes match each other and such that the scales of the histograms' horizontal axes match each other. This is because the first evaluation value which will be described later is calculated by comparing the first histogram and the second histogram with each other. The first histogram and the second histogram here are normalized such that the range of density values shown in the first histogram and the range of density values shown in the second histogram match. Specifically, the density value ranges of the two histograms are adjusted appropriately such that the total number of pixels used in the calculation of the first histogram matches the total number of pixels used in the calculation of the second histogram.

The first evaluation value represents a likelihood that each density value represents the specific region RA based on the first histogram and the second histogram. The evaluation unit 14 of this embodiment calculates, for each same density value range, a logarithmic value of the ratio of a frequency value in the first histogram to a frequency value in the second histogram, and uses the calculated logarithmic value as the first evaluation value. The first evaluation value is the ratio of the likelihood of being the specific region to the likelihood of being the background region RB, and is accordingly considered as an indicator that indicates, for each density value, the likelihood of the density value favorably representing the specific region. For example, at a first evaluation value of 1 or more, where the likelihood of representing the specific region RA is relatively higher than the likelihood of representing the background region, the likelihood of representing the specific region is evaluated as high, and it is evaluated that a larger first evaluation value indicates a higher likelihood of representing the specific region RA.

The first evaluation value is not limited to the mode described above, and can be any value defined by an arbitrary method based on the first histogram and the second histogram as long as the defined value indicates, for each density value, the likelihood of the density value representing a specific region. For example, the evaluation unit 14 may calculate, for each same density value range, a logarithmic value of the ratio of a frequency value in the second histogram to a frequency value in the first histogram to use the calculated logarithmic value as the first evaluation value. The first evaluation value in this case is the ratio of the likelihood of being the background region RB to the likelihood of being the specific region. Therefore, at a first evaluation value of 1 or less, for example, the likelihood of representing the specific region is evaluated as high, and it is considered that a larger first evaluation value indicates a lower likelihood of representing the specific region RA.

In this manner of calculating the first evaluation value with the use of the first histogram and the second histogram such that each density value represents the likelihood of being the specific region, where the first value that is an evaluation value about the likelihood of being a specific region is calculated based on both the likelihood of being the background region RB and the likelihood of being the specific region, the first evaluation value indicates the likelihood of being the specific region with high precision.

Further, assuming that the first evaluation value represents the logarithmic value of the ratio of the frequency value in the second histogram to the frequency value in the first histogram for each density value, the first evaluation value can be calculated with ease. Further, assuming that the first evaluation value represents a difference between the frequency value in the first histogram and the frequency value in the second histogram for each density value, the same effect is produced.

Figure 4D:
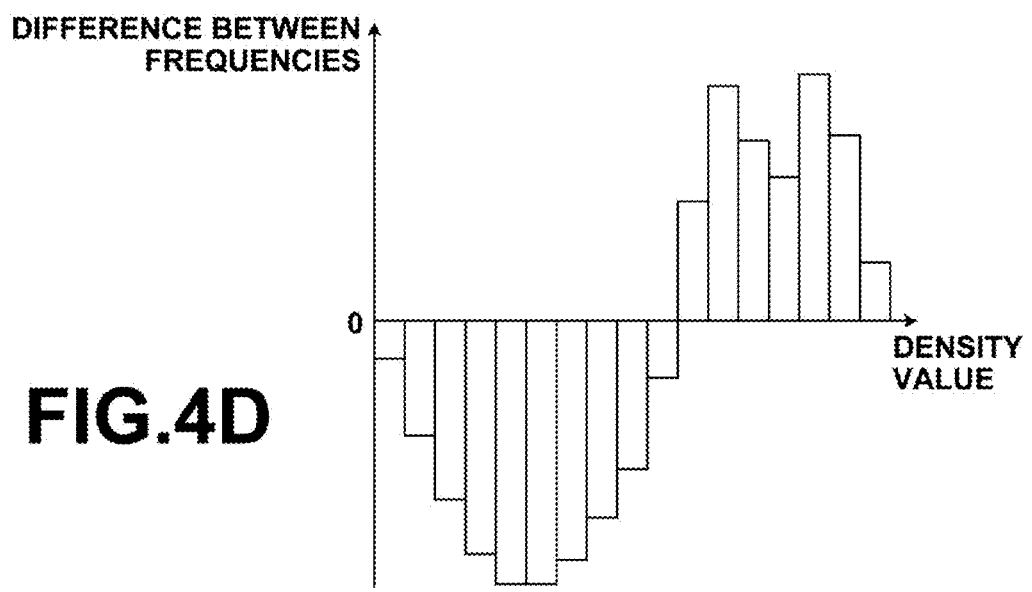
FIG. 4D is a graph showing differences (another example of the first evaluation value) between frequencies in the first histogram of FIG. 4A and frequencies in the second histogram of FIG. 4B.

FIG. 4D is a graph showing another example of the first evaluation value according to this embodiment. As shown in FIG. 4D, for example, the first evaluation value may be assumed to represent the difference between the frequency value in the first histogram and the frequency value in the second histogram for each density value. The frequency of a density value in the second histogram, which indicates the likelihood of the density value representing the background region RB as described above, can therefore be considered also as indicative of the likelihood of the density value not representing the specific region. A difference between a frequency value in the first histogram and a frequency value in the second histogram accordingly indicates a difference between the likelihood of representing the specific region and the likelihood of not representing the specific region, and the first evaluation value that is calculated as this difference indicates the likelihood of representing the specific region as well. It is evaluated that a larger first evaluation value indicates a higher likelihood of being a specific region also when the first evaluation value is a value obtained by subtracting a frequency value in the second histogram from a frequency value in the first histogram as shown in FIG. 4D.

The evaluation unit 14 calculates, for each pair of two adjacent pixels in the input image, a second evaluation value that indicates the likelihood of two adjacent pixels representing a contour, by acquiring the first evaluation value of each of the two adjacent pixels based on the density values of the two pixels, and calculating the second evaluation value based on the respective obtained first evaluation values of the two adjacent pixels.

The likelihood of two adjacent pixels representing a contour can be phrased as the likelihood of two adjacent pixels belonging to two different regions (the specific region RA and the background region RB). It is estimated that a pixel located in the specific region RA and a pixel located in the background region RB are likely to differ from each other in first evaluation value, which indicates the likelihood of being the specific region. Consequently, it is considered that the difference between the respective first evaluation values of two adjacent pixels is larger when one of the two adjacent pixels belongs to the specific region RA and the other pixel belongs to the background region RB, than when the two adjacent pixels both belong to the specific region RA (or the background region RB). Based on this, in this embodiment, the absolute value of a difference between the first evaluation value of a pixel in the input image I and the first evaluation value of an adjacent pixel which is adjacent to the former pixel is calculated as the second evaluation value, and it is evaluated that a larger second evaluation value indicates a higher likelihood of the two adjacent pixels representing a contour.

The second evaluation value is not limited to the mode described above, and can be any value defined by an arbitrary method based on the respective first evaluation values of two adjacent pixels, as long as the defined value indicates, for each pair of two adjacent pixels in an input image, the likelihood of the pair of pixels representing a contour (the likelihood of being the contour).

Figure 7:
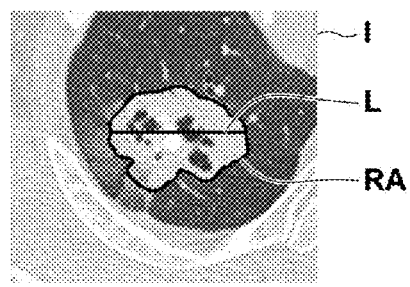
FIG. 7 is an image showing an example of a tumor extracted by the image processing device according to the present invention.

As described above, the evaluation unit 14 can calculate the second evaluation value which indicates the likelihood of being the contour with ease in a preferred manner in the case of calculating the second evaluation value based on the first evaluation value which indicates the likelihood of being the specific region for each pixel within the input image such that the second evaluation value which indicates the likelihood of being the contour becomes larger as the difference between the likelihoods of being the specific region of a pair of the adjacent pixels (the difference between the first evaluation values) becomes higher for each pair of two adjacent pixels within the input image I. In contrast, in a case where, for example, the likelihood of being the contour is defined such that the likelihood of being the contour becomes higher as the difference between the density values of the two adjacent pixels becomes larger based on only the information on the difference between the density values of the two adjacent pixels, it is difficult to accurately discriminate the contour of the image I in which the density value fluctuates in the specific region RA or the background region RB as in the input image I shown in, for example, FIG. 7.

The specific region extracting unit 15 then defines a first reference node S that belongs to the specific region RA, a second reference node T that belongs to the specific region RB, and a plurality of nodes $N_{ij}$ respectively representing pixels in the input image I. The specific region extracting unit 15 sets a connection cost, which indicates how likely the respective nodes are to be connected to each other, based on the second evaluation value, and connects the plurality of nodes to each other based on the connection cost, to thereby extract the specific region RA.

Figure 5:
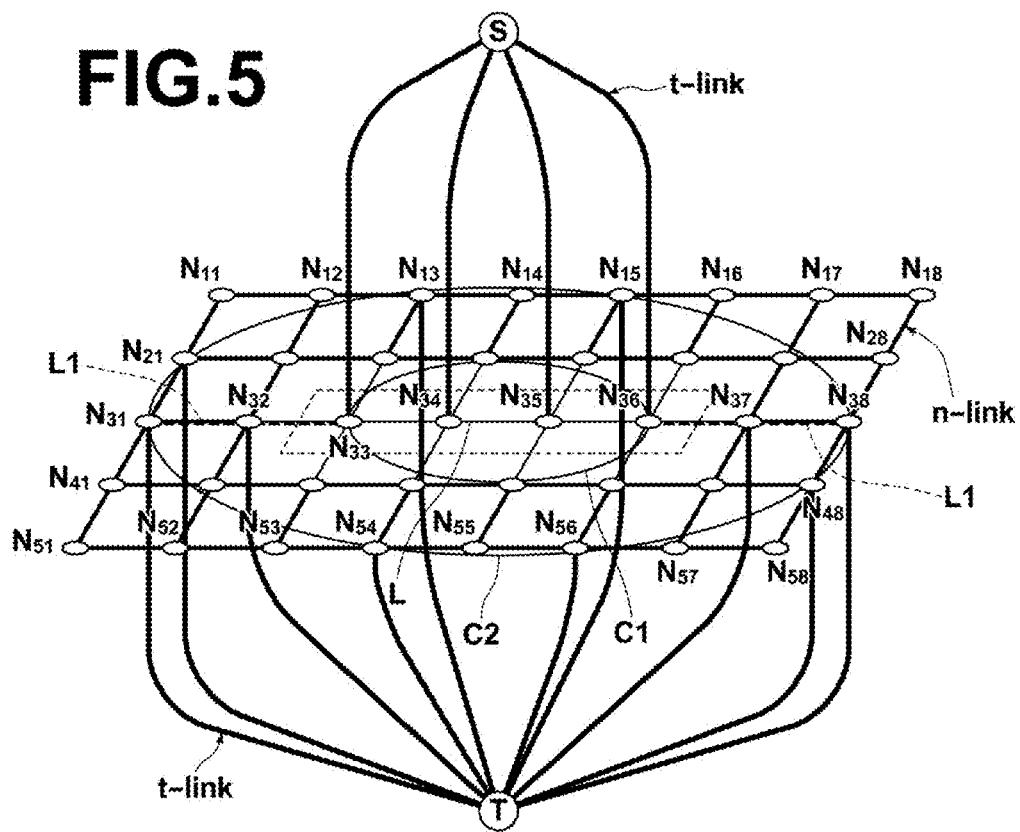
FIG. 5 is a diagram illustrating specific region extracting processing according to the embodiment of the present invention.

The specific region extracting unit 15 in this embodiment defines the input image I as a graph that includes, as illustrated in FIG. 5, the first reference node S (node S) belonging to the specific region RA, the second reference node T (node T) belonging to the background region RB, the plurality of nodes $N_{ij}$ respectively representing pixels in the input image I, and edges each connecting the plurality of nodes to each other. The specific region extracting unit 15 sets the connection cost based on the second evaluation value such that a higher likelihood of two adjacent pixels representing a contour equals a lower likelihood of connecting a node that corresponds to one of the two pixels to a node that corresponds to the adjacent pixel, and extracts the specific region RA from the graph by the graph cut technique, based on the connection cost. The intervals between nodes and the count of nodes in the graph of FIG. 5 are simplified for the sake of description. Details of the graph cut technique can be found in Patent Literature 1 as well.

When the entire region of the input image I is set as a determination region D, the specific region extracting unit 15 first creates a graph that includes, as illustrated in FIG. 5, the nodes $N_{ij}$ each representing a pixel in the determination region D, the nodes S and T which indicate labels that the pixels can have, n-links which are edges connecting nodes of adjacent pixels to each other, and t-links which are edges that connect the nodes $N_{ij}$ each representing a pixel to the node S representing the specific region, or to the node T representing the background region RB.

The n-links indicate the likelihood of adjacent pixels being pixels of the same region by the size of the connection cost (the thickness of the edges in FIG. 5). The connection cost of each n-link here is set, based on the second evaluation value, such that a higher likelihood of two adjacent pixels representing a contour equals a lower likelihood of connecting nodes that correspond to the two adjacent pixels to each other (equaling a thinner edge). This connection cost of the n-link may further be weighted based on the distance between the adjacent pixels, a difference in density value between the adjacent pixels, or the like. The thickness of the edge between nodes here indicates the size of the connection cost, and higher connection costs are set to thicker edges.

The t-links that connect the nodes $N_{ij}$ each representing a pixel to the node S representing the specific region RA indicate, for each pixel, the likelihood of the pixel being contained in the specific region RA. The t-links that connect the nodes $N_{ij}$ each representing a pixel to the node T representing the background region RB indicate, for each pixel, the likelihood of the pixel being contained in the background region RB.

In this embodiment, when a pixel in question can be determined as one belonging to the specific region RA by utilizing the information that identifies the set long diameter L1, the connection cost of the relevant t-link is set such that a node corresponding to the pixel is more likely to be connected to the node S representing the specific region RA (such that a thick edge connects a node corresponding to the pixel to the node S representing the specific region RA). When a pixel in question can be determined as one belonging to the background region RB, the connection cost of the relevant t-link is set such that a node corresponding to the pixel is more likely to be connected to the node T representing the background region RB (such that a thick edge connects a node corresponding to the pixel to the node T representing the background region RB).

Specifically, the connection cost of each t-link is set based on the following four conditions (1) to (4).

(1) For nodes corresponding to pixels that are located along the long diameter L (first nodes), the connection cost is set such that the nodes are more likely to be connected to the node S, because these pixels are likely to belong to the specific region RA.

(2) For nodes corresponding to pixels that are located along an extended line of the long diameter L and outside the ends of the long diameter L (second nodes which are nodes located along a broken line L1 in FIG. 5), the connection cost is set such that the nodes are more likely to be connected to the node T, because these pixels are likely to belong to the background region RB.

(3) For nodes corresponding to pixels that are located on an outer contour of the second region R2 in the input image (third nodes which are nodes located on the circumference of the circle C2 in FIG. 5), the connection cost is set such that the nodes are more likely to be connected to the node T, because these pixels are likely to belong to the background region RB (a region other than the specific region).

(4) For nodes that are none of the first to third nodes out of the nodes constituting the graph that represents the input image I, the connection cost is set such that the nodes are less likely to be connected to either the node S or the node T.

In the example of FIG. 5, nodes N33, N34, N35, and N36 qualify as the first nodes, and are connected to the node S based on Condition (1). Nodes N31, N32, N37, and N38 qualify as the second nodes, and are connected to the node T based on Condition (2). Nodes N13, N15, N21, N48, N54, and N56 qualify as the third nodes, and are connected to the node T based on Condition (3). Nodes in FIG. 5 that qualify as none of the first to third nodes are set so as not to be connected to either the node S or the node T (such that the connection cost is 0).

It is estimated that the specific region RA is likely to stretch outward from the long diameter L as its center. Accordingly, when nodes located along the long diameter L (the first nodes) are determined as likely to belong to the specific region RA and the connection cost is set such that the first nodes are more likely to be connected to the node S as in Condition (1), the specific region RA can be extracted with precision from a graph that represents an input image by favorably utilizing the information that identifies the set long diameter L.

Instead of Condition (1), the connection cost may be determined by an arbitrary method based on the set long diameter L such that nodes within a given range from the long diameter L are more likely to be connected to the node S. The given range can be set to an arbitrary range where the likelihood of belonging to the specific region is high, and a range that is a short distance from the long diameter is preferred as the given range.

The long diameter L is deemed as the maximum diameter of the specific region RA in a direction in which the long diameter extends, and it is therefore considered that the specific region RA is less likely to be outside the ends of the long diameter L in the direction in which the long diameter L extends. Accordingly, the specific region RA can be extracted with precision from a graph that represents an input image by favorably utilizing the information that identifies the set long diameter L also when nodes located along an extended line of the long diameter L and outside the ends of the long diameter L (the second nodes) are determined as likely to belong to the background region RB and the connection cost is set such that the second nodes are more likely to be connected to the node T as in Condition (2).

Instead of Condition (2), the connection cost may be set by an arbitrary method based on the set long diameter L such that nodes corresponding to pixels that are located outside the ends of the long diameter L in the direction in which the long diameter L extends are more likely to be connected to the node T.

Nodes located in a region that is sufficiently far from the set long diameter L are likely to belong to the background region RB. Accordingly, when nodes located along the outer contour of the second region R2, which is a region highly probable to be the background region RB, (the third nodes) are determined as likely to belong to the background region RB and the connection cost is set such that the third nodes are more likely to be connected to the node T as in Condition (3), the specific region RA can be extracted with precision from a graph that represents an input image by favorably utilizing the information that identifies the set long diameter L, because the third nodes are located sufficiently far from the long diameter L.

Instead of Condition (3), the connection cost may be determined by an arbitrary method based on the set long diameter L such that nodes that are at a given distance or more from the long diameter L are more likely to be connected to the node T. The given distance can be set to an arbitrary range where the likelihood of belonging to the background region RB is high, and a range that is a great distance from the long diameter L is preferred as the given distance.

The connection costs of the t-links are not limited to the mode described in this embodiment, and can be set by any method as long as the connection costs of the t-links are set such that the specific region RA and the background region RB can be separated from each other. Some or all of the connection cost settings based on Conditions (1) to (4) may therefore be omitted, or replaced by other methods, as long as the set connection costs of the t-links ensure that the specific region RA and the background region RB can be separated from each other.

In the case where information about which of the specific region RA and the background region RB a pixel in question represents is already given, the connection cost settings of the t-links described above can be set by any method based on the given information. In the case where the information is not given, the connection cost may be calculated based on statistical characteristics of density values in one or more pixels for which whether the pixel represents the specific region RA or the background region RB is known.

The specific region extracting unit 15 executes region segmentation by minimizing an evaluation function F, which indicates the sum of the connection costs of the t-links and the n-links in the graph described above, with the use of a known method that is applicable to the graph cut technique such as maximum flow-minimum cut. Consequently, appropriate links out of all t-links and n-links are cut as indicated by the dotted line in FIG. 5 to separate the node S from the node T, and the input image is divided into the specific region RA and the background region RB.

The display control unit 16 is for instructing to display on the display the input images I, various images created in the process of the image processing described above, the extracted specific region RA, and others suitably as the need arises, for example, in response to a user's instruction or a request made by a program.

Figure 6:
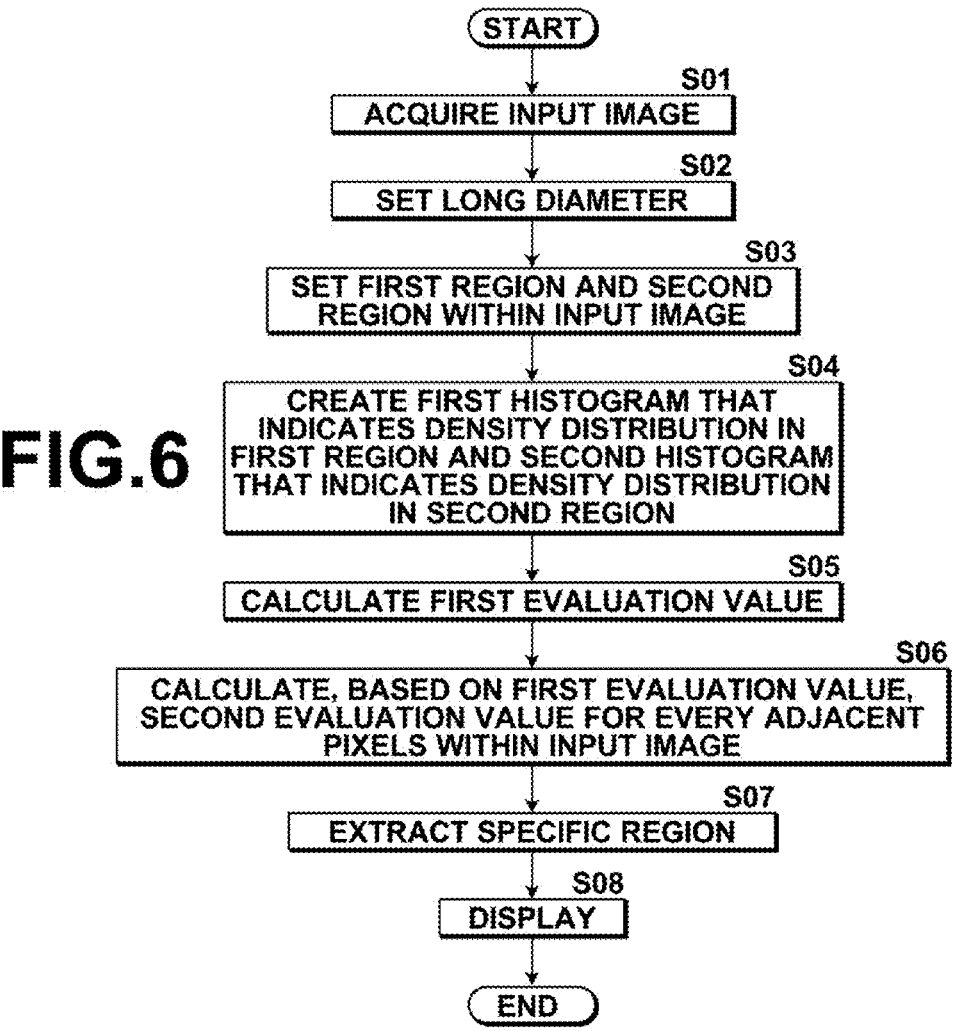
FIG. 6 is a flow chart illustrating an operation of the image processing device according to the embodiment of the present invention.

FIG. 6 is a flow chart illustrating a flow of processing executed by the image processing device 1 according to this embodiment. With reference to FIG. 6, the processing of the image processing device 1 according to this embodiment is described step by step in order below.

First, the image acquiring unit 11 acquires the input image I from the storage 2 (S01). Subsequently, the long diameter setting unit 12 sets the long diameter L by receiving information for identifying the long diameter input by the user's operation (S02). Based on the set long diameter L, the region setting unit 13 sets the first region R1, which is an elliptical region having the long diameter L as its major axis, and the second region R2, which is a ring-shaped region between the circle C1 having the long diameter L as its diameter and the circle C2 (S03).

Next, the evaluation unit 14 creates the first histogram based on the respective density values of pixels in the first region R1, creates the second histogram based on the respective density values of pixels in the second region R2, and normalizes the first histogram and the second histogram (S04). The evaluation unit 14 calculates, for each density value, a logarithmic value of the ratio of a frequency value in the first histogram to a frequency value in the second histogram, as the first evaluation value which indicates the likelihood of the density value representing the specific region RA (S05). The evaluation unit 14 further calculates, for each pair of two adjacent pixels in the input image I, the absolute value of a difference between the respective first evaluation values of the two adjacent pixels, as the second evaluation value which indicates the likelihood of representing a contour (S06).

The specific region extracting unit 15 next defines the input image I as a graph that includes the first reference node S belonging to the specific region RA, the second reference node T belonging to the background region RB, a plurality of nodes each representing a pixel in the input image I, and edges each connecting the plurality of nodes to each other. Based on the second evaluation value, the connection cost of each n-link is set such that connecting nodes that correspond to two adjacent pixels to each other is less likely as the likelihood of the two adjacent pixels representing a contour becomes higher. The connection cost of each t-link is also set, based on the set long diameter L, such that the first nodes that are estimated as belonging to the specific region RA are connected to the node S that represents the specific region RA, and such that the second nodes and third nodes that are estimated as belonging to the background region RB are connected to the node T that represents the background region RB. The specific region extracting unit 15 then divides the graph by minimizing the evaluation function F based on the connection costs, and thus extracts the specific region RA from the input image I (S07).

The display control unit 16 displays the extracted specific region RA on the display (S08), and the processing is ended. An example of the specific region RA that is extracted by region segmentation in the manner described above is shown in FIG. 7.

With the image processing device 1 according to this embodiment described above, the information for identifying the long diameter L of the specific region RA is effectively used to suitably set the first region R1 and the second region R2, calculate the first evaluation value based on the density histograms of the pixels in the first region R1 and the second region R2, calculate the second evaluation value which indicates the likelihood that the two adjacent pixels represent the contour based on the first evaluation value, and extract the specific region based on the second evaluation value, and hence the specific region can be extracted with high precision even when there is no information such as a machine learning result in regard to the shape or size of the specific region.

Further, when the long diameter setting unit 12 sets the long diameter L based on the user's input as described above, the user's judgment as to the input image can be used, and hence the long diameter L can be set more accurately.

Further, the region setting unit 13 sets the first region R1 as the ellipse whose long diameter is the long diameter L and the second region R2 as the region ranging outside the circle C1 whose diameter is the long diameter L based on the determination that the specific region RA covers a region with a middle point of the long diameter L as its center and that the long diameter L has a length corresponding to the maximum diameter of the specific region RA in a direction in which the long diameter L extends, and hence the evaluation unit 14 can use the information on the long diameter L in a preferred manner to calculate the first evaluation value which indicates the likelihood of being the specific region with higher precision and to accurately calculate the second evaluation value which indicates the likelihood of being the contour based on the first evaluation value.

Then, the specific region extracting unit 15 defines the first reference node S belonging to the specific region RA, the second reference node T belonging to the background region RB, and the plurality of nodes respectively representing the pixels of the input image I. By using the second evaluation value, the specific region extracting unit 15 sets the connection cost such that the nodes representing the two adjacent pixels become less likely to be connected to each other as the likelihood that the two adjacent pixels indicate the contour becomes higher. By connecting the plurality of nodes to each other based on the connection cost, it becomes easy to suitably separate the specific region RA from the background region RB between the two pixels having a large likelihood of being the contour with high precision, to thereby extract the specific region RA with high precision.

Further, in the above-mentioned embodiment, the specific region extracting unit 15 discriminates the node corresponding to the pixel that is highly likely to belong to the specific region RA and the node corresponding to the pixel that is highly likely to belong to the background region RB as the first to third nodes in a preferred manner, and connects the respective nodes such that the discriminated first to third nodes are more likely to be connected to the first reference node representing the specific region RA or the second reference node representing the background region RB appropriately, which allows the specific region to be extracted with higher precision by using the information on the long diameter L in a preferred manner.

Each embodiment described above is merely an example, and the descriptions given above are not to be used to interpret the technical scope of the present invention in a limited manner.

The technical scope of the present invention encompasses various modifications that are made, without departing from the spirit of the present invention, to the system configuration, hardware configuration, processing flows, module configurations, user interface, processing specifics, and the like of the embodiment described above.

The image processing device 1 may distribute the functions of the units described above among a plurality of computers. Any known devices can be employed as the input device, display, and other constituent devices of the system.

What is claimed is:

1. An image processing device, comprising:
   a memory configured to store processing instructions; and
   a processor configured to execute the stored processing instructions, which comprise:
   setting a long diameter of a specific region within an input image containing the specific region;
   setting, based on the set long diameter, a region of a predetermined shape including the set long diameter as a first region estimated as highly probable to be the specific region within the input image and a region of a predetermined shape outside the first region as a second region estimated as highly probable to be a background region, which is a region other than the specific region within the input image;
   calculating a first histogram, which is a density histogram of a density value of each pixel in the first region, and a second histogram, which is a density histogram of a density value of each pixel in the second region, calculating, for each density value, a first evaluation value which indicates a likelihood that the each density value represents the specific region based on the first histogram and the second histogram, and calculating, for each pair of two adjacent pixels within the input image, a second evaluation value which indicates a likelihood of being a contour, which is a likelihood that the two adjacent pixels represent the contour, based on the first evaluation values respectively corresponding to the density values of the two adjacent pixels; and
   extracting the specific region by defining a first reference node belonging to the specific region, a second reference node belonging to the background region, and a plurality of nodes representing respective pixels within the input image, setting a connection cost indicating how likely the respective nodes are to be connected to each other based on the second evaluation value, and connecting the respective nodes to each other based on the set connection cost.

2. An image processing device according to claim 1, wherein the first evaluation value represents a logarithmic value of a ratio of a frequency value in the first histogram to a frequency value in the second histogram.

3. An image processing device according to claim 1, wherein the first evaluation value represents a difference between a frequency value in the first histogram and a frequency value in the second histogram.

4. An image processing device according to claim 1, wherein the second evaluation value is calculated for each pixel within the input image such that the likelihood of being the contour becomes higher as a difference between the first evaluation values of the two adjacent pixels becomes larger.

5. An image processing device according to claim 1, wherein the connection cost is set based on the second evaluation value such that the nodes corresponding to the two adjacent pixels become less likely to be connected to each other as the likelihood that the two adjacent pixels represent the contour becomes higher.

6. An image processing device according to claim 1, wherein the connection cost is set based on the set long diameter such that the node located within a given range from the set long diameter becomes more likely to be connected to the first reference node.

7. An image processing device according to claim 1, wherein the connection cost is set based on the set long diameter such that the node corresponding to the pixel located outside both ends of the set long diameter in a direction in which the set long diameter extends becomes more likely to be connected to the second reference node.

8. An image processing device according to claim 1, wherein the first region comprises a region contained in an elliptical region whose long diameter is the set long diameter.

9. An image processing device according to claim 1, wherein the second region comprises a region of a given shape that is located outside a circle whose diameter is the set long diameter.

10. An image processing method for an image processing device, comprising:
    setting a long diameter of a specific region within an input image containing the specific region;
    setting, based on the set long diameter, a region of a predetermined shape including the set long diameter as a first region estimated as highly probable to be the specific region within the input image and a region of a predetermined shape outside the first region as a second region estimated as highly probable to be a region other than the specific region within the input image;
    calculating a first histogram, which is a density histogram of a density value of each pixel in the first region, and a second histogram, which is a density histogram of a density value of each pixel in the second region, calculating, for each density value, a first evaluation value which indicates a likelihood that the each density value represents the specific region based on the first histogram and the second histogram, and calculating, for each pair of two adjacent pixels within the input image, a second evaluation value which indicates a likelihood of being a contour, which is a likelihood that the two adjacent pixels represent the contour, based on the first evaluation values respectively corresponding to the density values of the two adjacent pixels; and
    extracting the specific region by defining a first reference node belonging to the specific region, a second reference node belonging to the background region, and a plurality of nodes representing respective pixels within the input image, setting a connection cost indicating how likely the respective nodes are to be connected to each other based on the second evaluation value, and connecting the plurality of nodes to each other based on the set connection cost.

11. A non-transitory computer-readable recording medium having recorded thereon an image processing program for causing a computer to execute:
    setting a long diameter of a specific region within an input image containing the specific region;
    setting, based on the set long diameter, a region of a predetermined shape including the set long diameter as a first region estimated as highly probable to be the specific region within the input image and a region of a predetermined shape outside the first region as a second region estimated as highly probable to be a region other than the specific region within the input image;
    calculating a first histogram, which is a density histogram of a density value of each pixel in the first region, and a second histogram, which is a density histogram of a density value of each pixel in the second region;
    calculating, for each density value, a first evaluation value which indicates a likelihood that the each density value represents the specific region based on the first histogram and the second histogram; and calculating, for each pair of two adjacent pixels within the input image, a second evaluation value which indicates a likelihood of being a contour, which is a likelihood that the two adjacent pixels represent the contour, based on the first evaluation values respectively corresponding to the density values of the two adjacent pixels; and extracting the specific region by defining a first reference node belonging to the specific region, a second reference node belonging to the background region, and a plurality of nodes representing respective pixels within the input image, setting a connection cost indicating how likely the respective nodes are to be connected to each other based on the second evaluation value, and connecting the plurality of nodes to each other based on the set connection cost.

12. An image processing device according to claim 1, further comprises:

an input device configured to receive specific positions within the input image according to operations of a user, wherein the setting the long diameter comprises setting the long diameter corresponding to the received specific positions.

* * * * *